United States Patent

Johnson et al.

[15] 3,659,138
[45] Apr. 25, 1972

[54] ALUMINA-METAL SEALED LAMP APPARATUS

[72] Inventors: Peter D. Johnson, Schenectady; Howard A. Poran, Elnora, both of N.Y.

[73] Assignee: General Electric Company

[22] Filed: Nov. 6, 1970

[21] Appl. No.: 87,525

[52] U.S. Cl. ............................................. 313/317, 313/290
[51] Int. Cl. ........................ H01j 5/20, H01j 5/32, H01j 5/04
[58] Field of Search ................................ 313/285, 290, 317

[56] References Cited

UNITED STATES PATENTS 3,588,577  6/1971  McVey ................................. 313/317

*Primary Examiner*—David Schonberg
*Assistant Examiner*—Paul A. Sacher
*Attorney*—John F. Ahern, Paul A. Frank, Richard Brainard, Jerome C. Squillaro, Frank L. Neuhauser, Oscar B. Waddell and Joseph B. Forman

[57] ABSTRACT

Improved seal structure, particularly useful in the fabrication of electric lamps and the like includes a crystalline alumina member and a thin molybdenum member sealed to one another by a substantial mass of interposed sealing glass having a softening point of approximately 1,400° C. to 1,600° C., and forming a concave surface between the sealed members which intersects the respective members at a small angle having a radius of curvature which is large as compared with the thickness dimension of the molybdenum member.

5 Claims, 5 Drawing Figures

Patented April 25, 1972
3,659,138
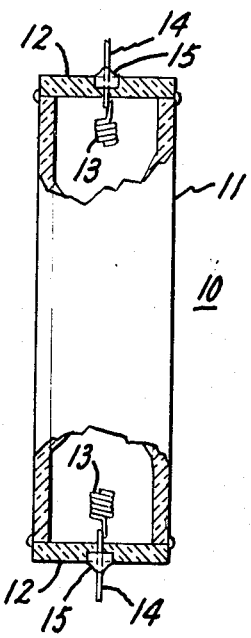
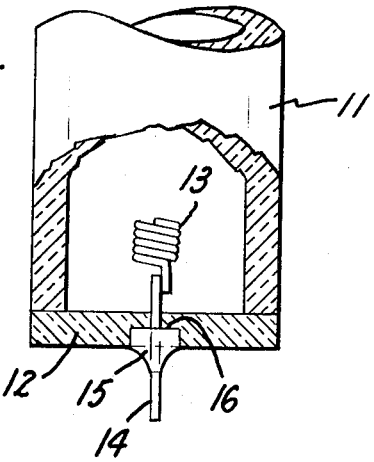
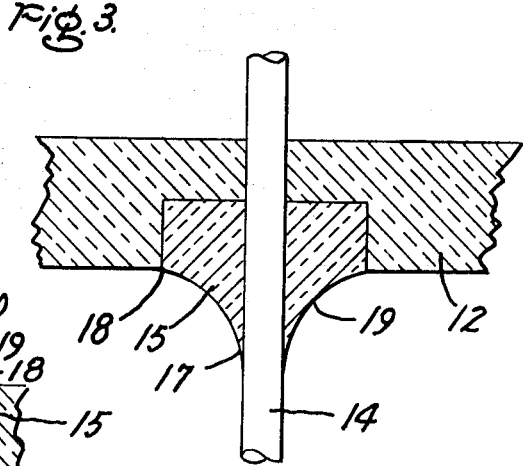
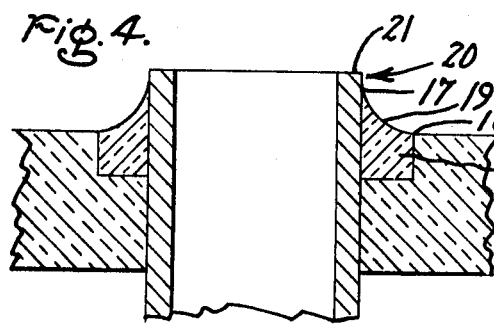
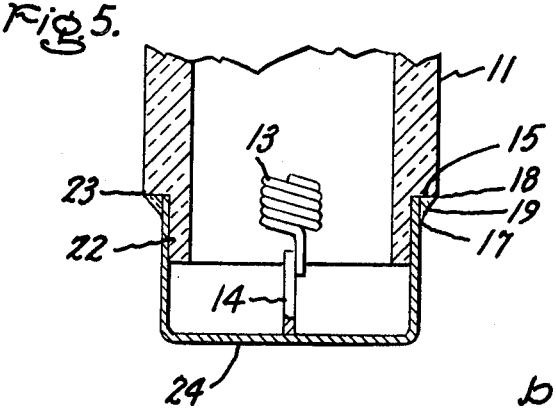
Inventors:
Peter D. Johnson,
Howard A. Poran,
by John F. Ahern
Their Attorney.

ALUMINA-METAL SEALED LAMP APPARATUS

This invention relates generally to improved metal to ceramic lamp apparatus and more particularly, to such apparatus wherein seals are made between metals and crystalline alumina.

In the development of improved lamp apparatus, the trend of innovation has generally been to higher temperature radiation sources, particularly of the electric arc type. The desirability for light transmissive lamp envelopes capable of withstanding increased operating temperatures, of the order of in excess of 1,000° C., had led to the development of improved crystalline alumina structures which are useful in lamp apparatus, as for example, the polycrystalline alumina disclosed and claimed in U.S. Pat. No. 3,026,203, to R. L. Coble. Additionally, it has been desirable in some instances to utilize single crystalline alumina, as for example, sapphire, for specific structures in which ultraviolet transmissivity is required at exceedingly high temperature of operation. As used herein, the term "crystalline alumina" is intended to be generic to polycrystalline alumina and monocrystalline alumina as for example, sapphire, since the invention may be practiced with both types of alumina structures.

Such crystalline alumina bodies despite their desirable characteristics are, however, not thermally malleable, as are conventional Pyrex and Nonex glass bodies. Accordingly, the familiar pinch type seals, to enfold and enclose in hermetic seal, inleads and other metallic bodies passing therethrough, may not be made utilitizing crystalline alumina bodies. In order to seal such bodies for lamp construction, generally a cylindrical tube thereof constitutes the arc-tube of a lamp and a disc of the same crystalline material is affixed to the end of the lamp arc-tube such as, for example, is disclosed and claimed in U.S. Pat. No. 3,336,134. Alternatively, a metallic end member may be affixed in, and sealed to, the lamp arc-tube.

Further difficulties are encountered with crystalline alumina envelopes. Thus, for example, few metals are able to match the thermal co-efficient of linear expansion of the alumina, which is of the order of $8 \times 10^{-6}$. Only niobium seems to be suitable, so that useful seals may be made thereto. Unfortunately, niobium is permeable to oxygen and, in circumstances in which oxygen is in the environment outside the arc-tube wall, oxygen may permeate the niobium and enter the arc-tube. The presence of oxygen in the arc-tube in electric lamps is detrimental and should be avoided. Although suitable getters are available to remove oxygen from the atmosphere within arc lamps, it is preferable that the arc-tubes thereof be impermeable to oxygen so that the use of getters must not be relied upon solely.

Accordingly, it is an object of the invention to provide seals for lamp envelopes which seal metal to crystalline alumina without permitting the penetration of oxygen therethrough.

Still another object of the invention is to provide improved crystalline alumina lamp structures.

Yet another object is to provide simple and inexpensive oxygen-impermeable seals for crystalline alumina bodies.

Briefly stated, in accord with one embodiment of the present invention, we provide electric lamp, and the like, seals for metal supports and leads to and through alumina bodies and including a molybdenum metallic member sealed through a crystalline alumina lamp tube by a body of a sealing glass which softens at temperatures of the order of 1,400° C. and has a substantial mass thereof surrounding the molybdenum member with a configuration such as to provide a concave exterior surface which intersects both the alumina and molybdenum bodies at small angles of 30° or less and which has a radius of curvature that is large as compared with the thickness dimension of the molybdenum member. Preferably, the sealing glass is calcium magnesium aluminate.

The novel features characteristic of the present invention are set forth in the appended claims. The invention itself, together with further objects and advantages thereof may best be understood by referring to the following detailed description, taken in connection with the appended drawing in which:

FIG. 1 is a schematic vertical cross-sectional view of an arc-tube of a lamp constructed in accord with the invention, FIG. 2 is an enlarged view of one end of the arc-tube of FIG. 1 illustrating in greater detail, the electrode support member as it passes through the lamp envelope wall, FIG. 3 is a further enlarged view of the seal shown in FIG. 2, FIG. 4 is an enlarged view of an alternative structure in which a hollow tube is sealed through a crystalline alumina envelope wall, FIG. 5 is an enlarged view of an alternative arc-tube end seal.

In FIG. 1 of the drawing, an arc-tube 10 of an electric discharge lamp constructed in accord with the invention is illustrated in schematic vertical cross-section. Arc-tube 10 includes a substantially cylindrical side wall member 11 and a pair of substantially disc-shaped end wall members 12 fused to the opposite ends thereof. A pair of coils of refractory metal, preferably tungsten, arc electrodes 13 are suspended in opposite ends of arc-tube 10 and are supported therein by a pair of arc-tube support members 14 which pass through end wall members 12 and are sealed thereto in vacuum tight seal by seal members 15.

FIG. 2 illustrates, in greater detail, the structure of one end of arc-tube 10 of FIG. 1. From FIG. 2 it may be seen that end wall member 12 encloses the end of sidewall member 11 and support member 14 passes through member 12 and is sealed in hermetic seal thereto with seal member 15. Arc electrode member 13, which may be the conventional coiled-coil or the double coiled high pressure metallic vapor discharge electrodes of tungsten, preferably is affixed to the inwardly depending end of electrode support member 14 and is in good electric contact therewith.

FIG. 3 of the drawing illustrates in even greater detail the seal 15, illustrated in FIGS. 1 and 2. In FIG. 3, seal 15 is comprised of a substantial mass of a sealing glass which is disposed within a recess 16 which is cut in the outwardly disposed surface of end wall member 12. Formation of the seal outwardly of end member 12 isolates the seal from the effects of the electric discharge. The seal 15 differs from the seals made in accord with many prior art teachings, as for example, the aforementioned patent and that of the glass containing version of the well-known and so-called "housekeeper seal", in that a substantial amount of sealing glass is utilized, as opposed to a very small amount of glass which is caused, in some instances, to be drawn between the members of the seal by capillary action. The large mass of sealing glass that comprises seal 15 is insured by requiring that the recess 16 in the exterior surface of end wall member 12 be large, i.e., approximately five times the dimension of support member 14. Seal 15 is further characterized in that the surface 19 thereof is concave and has a radius of curvature that is large, for example, approximately ten times that of the thickness of metallic member 14 which is sealed thereby to the crystalline end wall member 12. In further characterization of the physical configuration seal member 15, the intersection of concave surface 19 with both of metallic member 14 and crystalline end wall member 12 are made with relatively small angles, no greater than 30°, and preferably less than 10°.

As is set forth hereinbefore, crystalline ceramic bodies have very high thermal co-efficients of expansion and it is difficult to find metals which may be sealed thereto in a mechanically stable match. Niobium is one material which does provide such a match, but due to its permeability to oxygen, niobium is less than ideal, in that one must take great pains to getter the oxygen from the interior of the envelope sealed thereby and to maintain a getter for the removal of any oxygen which may permeate thereinto during operation.

We have found that molybdenum is an excellent metal for forming seals and that it is sufficiently impermeable to oxygen that getters may be rendered unnecessary in the same environment in which they are necessary with niobium. Additionally, we have found that although molybdenum exhibits a thermal co-efficient of expansion mismatch from crystalline alumina by a degree represented by respective co-efficients of approximately $6 \times 10^{-6}$ for molybdenum and, approximately $8 \times 10^{-6}$ for alumina, the effects of this may be overcome.

Specifically, we are able to overcome the thermal co-efficient of expansion mismatch of molybdenum and crystalline alumina in accord with the invention by requiring that the molybdenum material which is sealed through the end wall member have a maximum thickness dimension of only approximately 0.020 inches and further creating the seal with a sealing glass which is compatible with the alumina characteristics of high temperature operation in that it has a softening point of between 1,400° C. to 1,600° C. and preferably, approximately 1,450° C. to 1,550° C. In further characterization of the seals in accord with the present invention, we provide a substantial mass of the sealing glass and thereby cause the seal to have a concave exterior surface and intersect the crystalline alumina body and the molybdenum body with small angles of less than 30° so that when thermal stresses are applied, the stress is concentrated away from the portion of the seal that is made to the crystalline alumina and concentrated upon the molybdenum member which, by virtue of its small dimension is able to adapt due to its higher ductility and malleability as compared with the crystalline alumina. Although the most important characteristics of the present invention are in the physical configuration of the seal and the material from which the seal is created is not unique, we find that optimum results are obtained utilizing a sealing glass of calcium magnesium aluminate. The use of this glass in the configuration illustrated and described herein provides unique seals having the ability to form vacuum-tight seals with crystalline alumina bodies which are suitable for operation at temperatures in excess of 1,000° C. without fracturing or failing.

FIG. 4 of the drawing illustrates an alternative configuration of lamp seals in accord with the invention, wherein a tubular member 20 having a side wall member 21 is sealed through end wall member 12 by seal member 15 which forms a concave surface 19 having small angle intersections 17 and 18 with molybdenum wall 21 and crystalline alumina body 12. The tubular inlead, as is illustrated herein, may be utilized as a support member in an electric lamp or, alternatively, may be utilized to facilitate evacuation and filling of an electric lamp structure. Tubes 20, having an exterior diameter of approximately one inch and a wall thickness 21 of approximately 0.010 inches or less, may readily be sealed through end wall members 12 as is illustrated herein and operated at temperatures in excess of 1,000° C. without any loss of the vacuum-tight characteristics of the seal.

FIG. 5 of the drawing illustrates, in partial vertical section, an alternative embodiment of a lamp seal useful in arc-tubes such as illustrated in FIG. 1 of the drawing. In FIG. 5, the side wall member 11 has a reduced diameter collar 22 cut into the end portion thereof to produce a shoulder 23 upon which cup-shaped metallic molybdenum end wall member 24, to which is affixed electrode support member 14 and arc electrode member 13, is positioned. Molybdenum member 24 is sealed to the shoulder 23 of side wall member 11 by a seal 15 having a concave exterior surface 19 and small angles intersections 17 and 18 with the molybdenum and crystalline bodies, respectively.

The seals made in accord with the present invention may readily be made by placing the molybdenum and the crystalline bodies in place, as is illustrated in the drawings, together with a quantity of the desired sealing glass, as a frit, and the assembly placed in a vacuum furnace. The assembly is rapidly heated to a temperature, for example, above the softening point of the sealing glass while the pressure is maintained at a low value of approximately $5 \times 10^{-5}$ torr. The maximum temperature is maintained only for a sufficient time to cause the sealing glass to soften and flow, preferably for less than one minute, after which the furnace power is turned off and the entire assembly allowed to cool. Due to the quantity of the sealing glass utilized and the configuration of the seals, as is described hereinbefore, the natural characteristic of the glass upon cooling is to assume the desired concave shape which yields extremely strong seals which are capable of withstanding mechanical and thermal shock without fracturing and for maintaining good hermetic seal over the entire operating life of lamps in accord with the invention.

While the invention has been disclosed herein with respect to certain illustrated embodiments thereof, it is readily apparent that many modifications and changes will readily occur to those skilled in the art. For example, the invention contemplates non-lamp seals, and particularly, such non-lamp seals as are used to seal a sapphire window, for example, into a high temperature environment or one requiring a far U.V. transmissive section, as in a far U.V. standard source. Accordingly, we intend by the appended claims to cover all such modifications and changes as fall within the true spirit and scope of the foregoing disclosure.

What we claim as new and desire to secure by Letters Patent of the United States is:

1. In an electric discharge lamp including an envelope wall of crystalline alumina containing a pair of arc-electrodes and a charge of light emitting species, the improvement comprising a molybdenum member having a thickness dimension of less than 0.020 inches sealed through said crystalline alumina and affixed thereto by a sealing glass having a softening point of approximately 1,400° C. to 1,600° C. and wherein said sealing glass is interposed between said envelope wall and said molybdenum member in a substantial mass and has a concave surface configuration which intersects both with a small angle of less than 30° and has a surface therebetween with a radius of curvature which is large as compared to the thickness of said molybdenum member.

2. The improvement of claim 1 wherein both of said angles are of less than 10° and said radius is in excess of 0.10 millimeter.

3. The improvement of claim 1 wherein said sealing glass is calcium magnesium aluminate.

4. The improvement of claim 3 wherein said envelope wall is a polycrystalline alumina ceramic.

5. The improvement of claim 1 wherein said molybdenum is an electrode support member and an arc-electrode is affixed to the inwardly-depending end thereof.

* * * * *